(12) United States Patent
Kraemer

(10) Patent No.: US 9,393,743 B2
(45) Date of Patent: Jul. 19, 2016

(54) APPARATUS FOR CARRYING OUT A RESIN TRANSFER MOLDING (RTM) PROCESS AND RESIN TRANSFER MOLDING (RTM) PROCESS

(75) Inventor: Dirk Kraemer, Niederbreitbach (DE)

(73) Assignee: First Composites GmbH, Niederbreitbach (DE)

( * ) Notice: Subject to any disclaimer, the term of this patent is extended or adjusted under 35 U.S.C. 154(b) by 724 days.

(21) Appl. No.: 13/806,674
(22) PCT Filed: Jun. 28, 2011
(86) PCT No.: PCT/DE2011/075151
§ 371 (c)(1), (2), (4) Date: Dec. 21, 2012
(87) PCT Pub. No.: WO2012/052009
PCT Pub. Date: Apr. 26, 2012

(65) Prior Publication Data
US 2013/0099405 A1  Apr. 25, 2013

Related U.S. Application Data
(60) Provisional application No. 61/359,600, filed on Jun. 29, 2010.

(30) Foreign Application Priority Data
Jun. 29, 2010 (DE) ............ 20 2010 007 931 U

(51) Int. Cl.
B29C 45/02 (2006.01)
B29C 70/48 (2006.01)
(Continued)

(52) U.S. Cl.
CPC ............ *B29C 70/48* (2013.01); *B29C 43/18* (2013.01); *B29C 45/14* (2013.01); *B29C 45/66* (2013.01); *B29C 51/10* (2013.01); *B29C 2791/006* (2013.01)

(58) Field of Classification Search
CPC ........ B29C 43/18; B29C 45/14; B29C 45/66; B29C 51/10; B29C 2791/006
USPC .......... 425/127, 129.1, 150, 388, 405.2, 546, 425/DIG. 60; 264/102, 257, 511, 553, 571, 264/DIG. 78
See application file for complete search history.

(56) References Cited

U.S. PATENT DOCUMENTS 5,403,537 A   4/1995 Seal et al.
5,518,385 A *   5/1996 Graff ............... B29C 70/48
                                                    264/102

(Continued)

FOREIGN PATENT DOCUMENTS

DE   199 22 850 C1   8/2000
DE   600 11 752 T2   7/2005

(Continued)

OTHER PUBLICATIONS

Corresponding International Search Report with English Translation dated Mar. 21, 2012 (seven (7) pages).

(Continued)

*Primary Examiner* — Tim Heitbrink
(74) *Attorney, Agent, or Firm* — Crowell & Moring LLP

(57) ABSTRACT

Apparatus for resin transfer molding (RTM) and an RTM process for producing integral components. The apparatus has a closable mold (W) with a mold cavity (F), and an injection unit (10) coupled to the mold such that a resin is introducible into the mold; the mold has at least one resin outlet (3) connected to the mold cavity through which resin escapes after the mold is filled; a measuring unit situated at or downstream from the outlet detects escaping resin flow is and is coupled to a resin flow closing unit (5) such that the unit closes the outlet when escaping resin is detected. In the process a control system (11) transmits a signal for closing the resin flow closing unit to the closing unit when resin flow is detected such that the resin flow closing unit is closed and the flow of resin escaping the mold is interrupted.

14 Claims, 2 Drawing Sheets

(51) Int. Cl.
　　　*B29C 45/66*　　　(2006.01)
　　　*B29C 43/18*　　　(2006.01)
　　　*B29C 45/14*　　　(2006.01)
　　　*B29C 51/10*　　　(2006.01)

(56) References Cited

U.S. PATENT DOCUMENTS

| | | | |
|---|---|---|---|
| 5,518,388 | A | 5/1996 | Swenor et al. |
| 2005/0040553 | A1 | 2/2005 | Slaughter et al. |
| 2005/0079241 | A1* | 4/2005 | Moore ................. B29C 70/086 425/388 |
| 2006/0197244 | A1* | 9/2006 | Simpson ............. B29C 47/0014 264/29.7 |
| 2007/0145622 | A1 | 6/2007 | Cicci et al. |
| 2009/0074905 | A1* | 3/2009 | Matsen ................. B29C 33/06 425/547 |
| 2010/0019405 | A1 | 1/2010 | Eberth et al. |
| 2010/0181018 | A1* | 7/2010 | Walczyk ................. B29C 70/44 156/243 |
| 2013/0130583 | A1* | 5/2013 | Bjornhov ................ B29C 70/48 442/218 |
| 2014/0333008 | A1* | 11/2014 | Harboe ................. B29C 70/443 264/299 |

FOREIGN PATENT DOCUMENTS

| | | |
|---|---|---|
| DE | 10 2005 053 691 A1 | 5/2007 |
| DE | 10 2007 060 739 A1 | 6/2009 |
| DE | 10 2009 010 692 A1 | 12/2009 |
| FR | 2 771 960 A1 | 6/1999 |
| GB | 944 955 | 12/1963 |

OTHER PUBLICATIONS

International Report on Patentability and Translation of Written Opinion (twelve (12) pages).

M. Unterberger et al., "Produktionsparameter Beim RRIM-Prozeß Kontinuierlich überwachen", Kunststoffe, vol. 80, No. 8, 1990, pp. 877-879, Munchen, Germany, XP 000150773.

* cited by examiner

APPARATUS FOR CARRYING OUT A RESIN TRANSFER MOLDING (RTM) PROCESS AND RESIN TRANSFER MOLDING (RTM) PROCESS

This application is a national stage of PCT International Application No. PCT/DE2011/075151, filed Jun. 28, 2011, which claims priority to German patent application: DE 10 2010 007 931.4, filed Jun. 28, 2010 in the German Patent Office, the disclosures of which are herein incorporated by reference in their entirety. This application further claims priority to U.S. application Ser. No. 61/359,600 filed Jun. 29, 2010, the disclosure of which is herein incorporated by reference in its entirety.

The invention relates to an apparatus for carrying out a resin transfer molding (RTM) process, and an RTM process for producing in particular integral components.

BACKGROUND AND SUMMARY OF THE INVENTION

The RTM process has been used for many years in the production of integral components. It is a resin infusion process which is usually used for producing fiber composite components. According to Wikipedia, resin transfer molding (RTM) is a process for producing molded parts from duroplastics and elastomers. In comparison to pressing, the molding compound is injected by means of a piston from a usually heated prechamber via distributor channels into the mold cavity, where it cures under heat and pressure.

Formaldehyde resins (PF, MF, etc.) and reaction resins (UP, EP) containing small filler particles and elastomers may be used as molding compound.

At the start of a cycle, a preplasticized, metered molding compound is present in a prechamber. First, the mold is closed. The molding compound is subsequently injected into the mold and left therein for a certain time. During this so-called residence time, the molding compound reacts or vulcanizes. This depends on various factors (type of resin, filler, process pressure and temperature). The mold may be opened when the residence time has ended. The previously filled molding compound is now solid (cured), and is referred to as a molded part. The molded part may now be removed from the mold. The mold is subsequently cleaned, and a new cycle may begin. The dimensions of the molding compound required for the pressing and repressing should always be larger than the final molded part so that the mold is completely filled. This guarantees that the molded part is fully formed, and no air is pressed in. The excess molding compound remaining in the prechamber, also referred to as a waste cake, must be removed before the start of the new cycle and replaced by new molding compound. To also process long fibers or fiber semifinished products (prewovens/preforms), these are placed in the mold beforehand and extrusion coated with the molding compound. In addition, the cavity (mold cavity) is usually evacuated to avoid air inclusions.

Resins having a low viscosity are usually used as injection resins. As a result, the flow resistance during flow through the mold remains low, and minor pressure differences are necessary for the filling. Reaction resins for RTM processes are offered as specialized injection resins made of a resin component and a hardener component. In the RTM process, during the injection process resin flows through the mold space at the appropriate flow rate, fills the mold space, wets the inserted materials, and exits from the mold.

Low-reactivity resin systems may be mixed prior to the infusion. If the use of high-reactivity resin systems is desired, the resin and hardener may be mixed only directly in the infusion line or the mold. Lower cycle times are thus possible. Processes in which the injection resin components are mixed only immediately prior to injection are also known as reaction injection molding (RIM) processes.

The patent literature, for example in the publication DE 600 11 752 T2, describes a method for producing structural parts from composite material according to the resin injection process, and a corresponding apparatus. In this approach, the vacuum sealing of the closed mold is verified prior to the resin transfer, and cured resin residues which are not used for the component are removed from a container which is used for additional conditioning and supply of resin. In addition, the pressure is measured to determine the seal-tightness of the mold, and a temperature control device is provided.

Furthermore, a method and a mold for producing fiber composite components are known from the publication DE 10 2007 060 739 A1, in which the progression of the flow front is detected by pressure sensors facing the mold cavity, and the cooling in the edge region is varied as a function of the flow front.

DE 10 2009 010 692 A1 describes, among other things, an apparatus and a method for carrying out an RTM process, the apparatus having an injection unit and a closable mold provided with a mold cavity, and the injection unit being coupled to the mold in such a way that an injection resin is introducible into the mold, the mold having at least one resin outlet which is closable by means of a closing device and connected to the mold cavity, and from which the injection resin may escape after the mold has been filled. The fiber composite component may be monitored during the production process by means of a process sensor system, the process sensor system being coupled to the process actuator in a controlling manner. A camera is provided in a transparent area in the mold, and records an image of the resulting fiber composite component. In addition, the pressure and the temperature in the mold are detected by means of appropriate sensors. Furthermore, a mixing head is provided in which the components are mixed immediately before being injected. In this approach there is no option for recognizing the escape of resin from the mold when it is filled.

An apparatus for producing components from fiber composites is known from the publication DE 19922850 C1, in which a mold is provided which has connecting means for injecting a resin and for reducing pressure and which is composed of cooperating molded parts, at least one molded part having a dimensionally stable design corresponding to the contour of the outer surface of the component, and a fiber structure fitting being insertable between the cooperating molded parts. The bottom part of the mold is the entry device for the resin, for which purpose appropriate channels are provided. A connecting means in the form of a flow valve is provided at the input side and output side of each channel, and is connected to a control system via control lines. An individual line may thus be opened or closed; however, it is also not possible to appropriately detect the escape of resin from the mold.

DE 10 2005 053 691 A1 describes a mold for a resin transfer molding process, having a cavity, a resin trap, and a transition area, the cavity being configured in such a way that a component may be accommodated therein. The resin trap is integrated into the mold, and the transition area is configured in such a way that it may be used to establish a connection between the cavity and the resin trap. A resin tube is provided between the resin trap and the cavity, and is closable by means of a stopcock. In this approach as well, no additional means are present for detecting the escape of resin from the cavity.

An approach for producing reinforced plastic structures is described in the publication GB 944955, in which the mold has a mold cavity, on the outlet side of which a line having a trap for the injected material and the material escaping from the mold is situated. A shutoff valve is situated downstream from the trap.

A similar approach is described in U.S. Pat. No. 5,403,537 A, in which a resin trap and a shutoff valve are provided, also on the outlet side. However, the valve is situated between the mold and the resin trap.

Likewise, a major disadvantage of the two approaches mentioned above is that the escape of resin from the mold is not directly detectable. Thus, the above-mentioned approaches have the drawback that it is not easily and reliably detectable, not even by measuring the pressure rise, if the mold is filled with the injected material and resin has escaped from the mold cavity.

The object of the invention is to develop an apparatus for carrying out a resin transfer molding (RTM) process, and an RTM process for producing in particular integral components, by means of which it may be easily signaled that the mold cavity is completely filled with injection material, and also ensured that material escaping from the mold cavity is supplied for reuse.

This object is achieved by the features of claims 1 and 7. Advantageous embodiments result from the subclaims.

To this end, the apparatus according to the invention has an injection unit and a closable mold provided with a mold cavity, the injection unit being coupled to the mold in such a way that an injection resin is introducible into the mold, and wherein the mold has at least one resin outlet, which is closeable by means of a resin flow closing unit and is connected to the mold cavity, and from which injection resin may escape after the mold has been filled, and a measuring unit which detects the escaping resin flow is situated at or downstream from the mold outlet, and is coupled to the resin flow closing unit in such a way that the resin flow closing unit closes when resin flow is detected by the measuring unit.

The configuration of the measuring unit for detecting the resin flow at the resin outlet or downstream therefrom may be implemented very easily and cost-effectively, since the measuring unit does not have to be integrated directly into the mold.

For the detection of escaping injection resin using the measuring unit, an appropriate signal for closing the resin flow closing unit is output, in particular via a control system, as a result of which the resin flow closing unit is closable, and therefore the further escape of resin from the mold cavity stops.

In particular, the apparatus has a plastic hose adjoining the resin outlet of the mold, through which injection resin escaping from the resin outlet flows, the measuring unit detecting the resin flow through the plastic hose, and for this purpose being designed in particular as a capacitive measuring unit for resin flow detection.

The plastic hose is preferably transparent, at least in places, and the measuring unit is designed in the form of an optical measuring unit/sensor or capacitive measuring unit/sensor for resin flow detection which is situated at the transparent area.

The resin flow closing unit for interrupting the resin flow is in particular a valve, for example a pneumatically controlled check valve.

The plastic hose connected to the resin outlet of the mold leads to a collection container for the injection resin escaping from the mold, which is preferably detachably connected to the hose, for example via a clamp connection.

The collection container is advantageously designed as a disposable collection container which is removable after the injection resin cures and, together with the collected resin, is suppliable to thermal processing/reuse.

The pressure in the mold cavity is detectable by one or more pressure sensors, wherein the resin flow closing unit, which has been closed by the signal of the measuring unit, is reopened when a predefined pressure is exceeded, thus avoiding damage to the mold or degradation of the quality of the component to be produced, on account of excessive pressure.

When the resin flow closing unit is opened upon exceedance of a predefined pressure in the mold cavity, the measuring unit for detecting the resin flow is deactivated to prevent it from once again triggering a signal for closing the resin flow closing unit when additional resin flows through the resin outlet or the line attached thereto for the desired pressure reduction.

After the pressure drops below the predefined maximum pressure, the resin flow closing unit in the form of the valve is once again closed.

The mold has a number of resin outlets, corresponding to the configuration of the integral components, which preferably are each connected at the highest position in the mold cavity. An appropriate measuring device for detecting the resin flow as well as a resin flow closing unit are associated with each resin outlet or the line adjoining same. All the lines may lead into the same collection container, or a separate collection container may also be connected to each line or each tube.

The apparatus also has an injection unit which is coupled to the mold, having a mixing unit (mixing head) for a resin and a hardener for the injection resin, which is connectable to the mold and supplied with the two components to be mixed via two feed hoses from two storage tanks by means of a separate motor-pump in each case, the mixing head having a heating device for heating, and a mixing device for mixing, the two components. It is advantageous if the conveyed volume of the components to be mixed is reduced when a predefined pressure in the mold cavity is exceeded.

In addition, discharge hoses are provided parallel to the feed hoses and return/recirculate the unmixed components to their respective storage tanks.

For the production of integral components, a preform is placed in the mold cavity prior to injection of the injection resin.

The method in the form of the resin transfer molding (RTM) process for producing in particular integral components is carried out using an injection unit and a closable mold, provided with a mold cavity, to which the injection unit may be coupled, an injection resin being introducible into the mold, and the mold having at least one resin outlet which is closable by means of a resin flow closing unit and is connected to the mold cavity, and from which injection resin may escape after the mold has been filled, wherein a measuring unit which detects the escaping resin flow is situated at or downstream from the resin outlet, and is coupled to the resin flow closing unit, and a signal for closing the resin flow closing unit (5) is output to the resin flow closing unit via a control system when resin flow is detected by the measuring unit, and the resin flow closing unit is closed and the resin flow escaping from the mold is interrupted.

The pressure which occurs in the mold cavity during the RTM process is advantageously detected by at least one pressure sensor, and when a predefined pressure is exceeded, the resin flow closing unit, which has been closed by the signal of the measuring unit/sensor, is reopened.

When the resin flow closing unit is opened upon exceedance of a predefined maximum pressure in the mold cavity, the measuring unit for detecting the resin flow is deactivated, and the resin flow closing unit once again closes after the pressure drops below the predefined maximum pressure, It is also possible to reduce the conveyed volume of the components to be mixed when a predefined pressure in the mold cavity is exceeded.

Different processing modes having different automation levels may be achieved by means of the method.

In a manual/automatic mode, the first closing (of the resin flow closing unit) is triggered as a result of the sensor(s) detecting resin escaping from the resin outlet(s), and at the start of a flushing operation in the further injection process, the opening and closing process of the resin flow closing unit is detected and stored by the control system as a chronological sequence of the on/off (0, 1) state of all connected resin flow closing units until the end of the injection process, the control system outputting auditory and/or visual warnings if the pressure parameters are above the predefined limit values.

In a partially dynamic process, the routine which is detected and recorded in a manual process is carried out as a temporally detected process of the opening and closing of the pneumatic valves of the check valve unit (resin flow closing unit), the routine of the partially dynamic process in an automatic mode being available as a file, and being read by the software upon start-up of the automatic mode, and being started and executed at the appropriate time in the injection process.

It is possible for the automatic process to be carried out also taking into account the changing/increasing pressure in the cavity as the injection process proceeds over time, the control system opening the valves (resin flow closing unit) at which exceedances of the pressure limit values occur, until the values drop below the limit values.

A learning process may thus be implemented from the manual process all the way to the automatic process.

The invention provides a simple and reliable apparatus for the RTM process by means of which it is recognizable that the mold cavity is completely filled, which prevents excessive strain on the mold and the component to be produced as the result of excessive pressure in the mold, and by means of which excess resin escaping from the mold may be supplied for reuse, or in the event of malfunctions, unmixed components present in the system may be returned, for example to their respective storage tanks or other collection containers.

BRIEF DESCRIPTION OF THE DRAWINGS

The invention is explained in greater detail below with reference to exemplary embodiments and associated drawings, which show the following.

DETAILED DESCRIPTION

Figure 1:
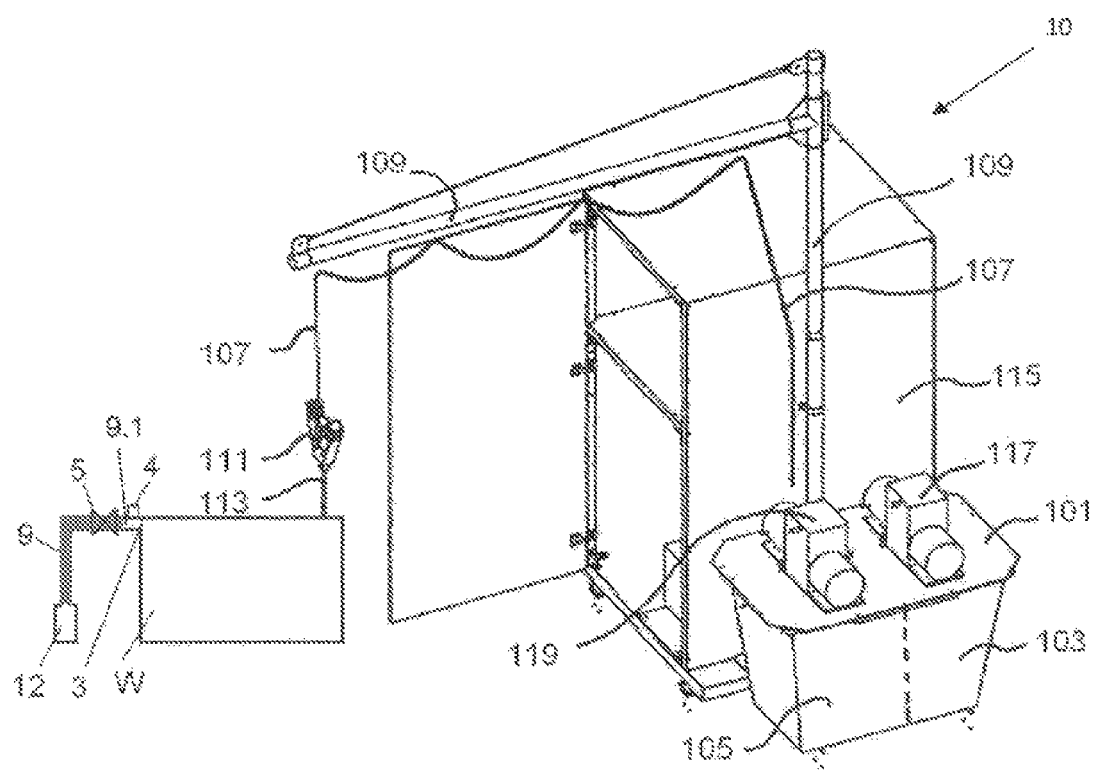
FIG. 1 shows a schematic illustration of the overall apparatus for carrying out the RTM process.

The apparatus according to the invention has in each case an injection unit 10 having a storage tank 103/105 for resin and hardener, and a mixing head 111 for combining these components. A nozzle 113 is attached to the mixing head 111 through which the resin-hardener mixture is suppliable to the mold cavity, not visible here, of the mold W. The mixing head 111 and/or the nozzle 113 may be designed as a disposable part. To have flexibility and variability in the use of the RTM facility, the resin and the hardener are conveyed from the storage tanks 103/105 to the mixing head 111 in separate hoses of a hose assembly 107. The divided motor-pump unit 117/119 used for this purpose is configured and dimensioned for the resin-hardener mixture used. The configuration and dimensioning are based in particular on the viscosity and the desired conveyed volume. One motor-pump unit 117 is associated with the storage tank 103 for the resin, and the other motor-pump unit 119 is associated with the storage tank 105 for the hardener. The connected hose assembly 107 includes two separate hoses.

The apparatus has a control cabinet 115 having the control/operating unit (not illustrated here) as well as a cantilever arm 109 for attaching the hose assembly 107, to which the mixing head 111 is detachably fastened. The mold W is reached via the pivotable cantilever arm 109. The motor-pump unit 117/119 conveys the hardener and the resin from the storage tanks 103/105, which are provided in a shared container 101, via the hose assembly 107 to the mixing head 111. Resin and hardener are mixed and heated in the mixing head 111 (preferably a dual-chamber mixing head), and conveyed via the nozzle 113 from the above-described injection unit 10 to the mold W. Depending on the type of component to be produced and the correspondingly shaped mold cavity (not illustrated here), the mold W has one or more resin outlets, in the present case one resin outlet 3 being indicated. Adjoining the resin outlet 3 is a line, in the present case a plastic hose 9, which is transparent at least in an area 9.1 that is preferably situated directly behind the resin outlet 3 of the mold W. A sensor 4 is situated on the outside at the transparent area, and detects when resin is flowing into the hose 9. A resin flow closing unit 5 in the form of a pneumatically controlled check valve is provided downstream from the sensor 4. The hose 9 opens into a collection container 12 which is suppliable with the material, collected therein, for reuse.

Figure 2:
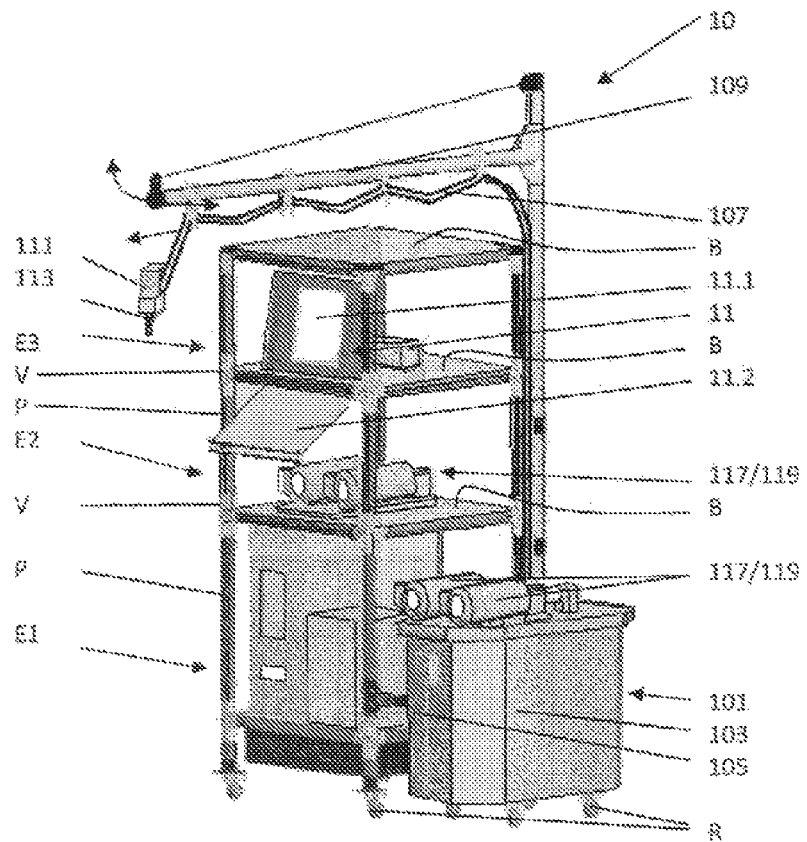
FIG. 2 shows a three-dimensional illustration of an injection unit 10.

A variant of an injection unit 10 is illustrated in FIG. 2. This injection unit has a modular design, and instead of a conventional control cabinet has a rack, which in the present case has three levels E1, E3, E3. The container 101 having the storage tanks 103/105 is provided at the side of the rack, and is preferably provided with a filling level monitor, and on its top side has the motor-pump unit 117/119.

The heating unit, not described in greater detail, for the preferably electrical heating of the components present in the storage tanks 103, 105 is situated in the first (bottom) level E1. The second (middle) level E2 is used for storing components or replacement parts, for example an additional motor-pump unit 117/119 which optionally has a different technical configuration, depending on the resin system and the injection volume.

It is possible for the motor-pump unit 117/119 to have a divided design, and for the motor and the pump to be connected via a quick coupling.

The operating unit, which has the control system 11 and a screen 11.1, is situated in the third (top) level E3. An extendable desktop 11.2 is also preferably provided. Separate hoses of a hose assembly 107 as shown in FIG. 1, which are accommodated on a pivotable cantilever arm 109, lead from the storage tanks 103, 105 to a preferably heatable mixing head 111 having a nozzle 113. The rack is essentially composed of profile rods P, connecting profiles V, and rack shelves B, and (the same as the container 101) has rollers R on its bottom side. Of course, the rack may be expanded, or also provided with a housing or side walls.

The profile rods P of the rack are in particular made of a rod-like plastic multiprofile having a core of foamed plastic material that is provided with a casing made of fiber-reinforced plastic (preferably carbon fiber material). The profile rods P have hard points, for example in the form of metal inserts, at the connecting positions to the connecting profiles V.

By use of these types of profile rods P, which may be easily assembled to form the rack by means of the connecting profiles V and using the rack shelves B, a simple, lightweight, and yet stable design is ensured, which thus provides significant advantages over a conventional control cabinet.

Figure 3:
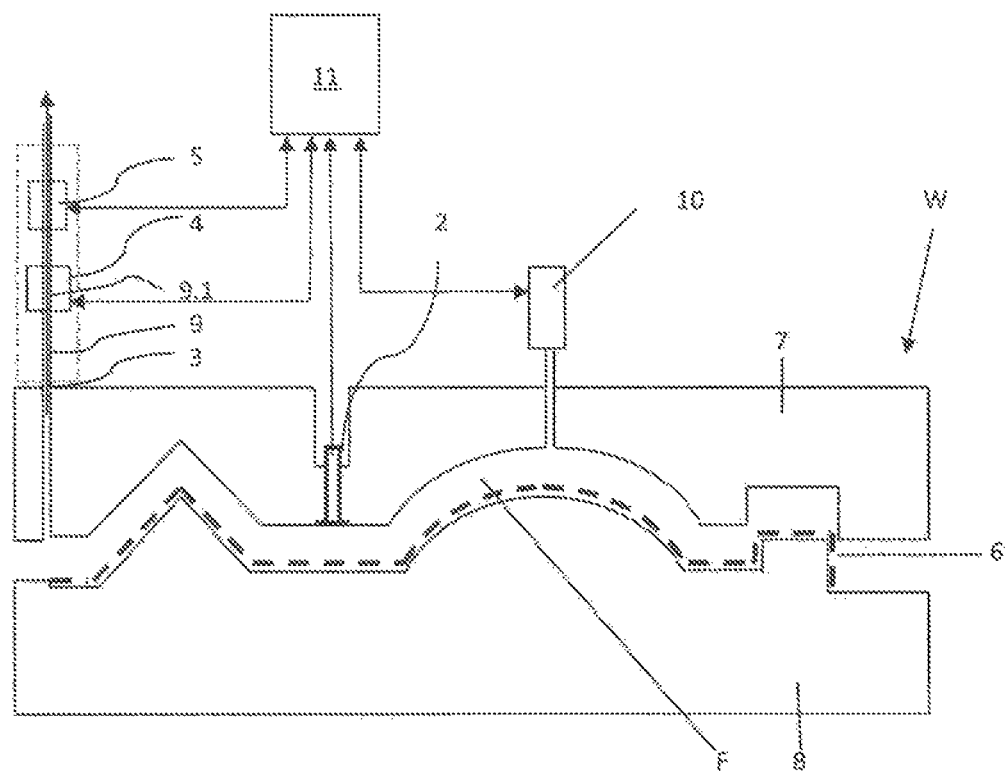
FIG. 3 shows the mold together with the associated measuring means, the closing unit, and the control system in a schematic illustration.

FIG. 3 shows the two-part mold W, having an upper mold half 7 and a lower mold half 8, between which a mold cavity F is formed in the closed state. In the present case, a preform 6 or insert, illustrated by a dashed line, has been inserted into the mold cavity F. Situated in the upper mold half 7 is a pressure sensor 2, extending to the mold cavity F, by means of which the pressure that occurs during the injection is detectable.

Also apparent from FIG. 2 is an ascending line or an ascending pipe (not designated by a reference numeral), having a resin outlet 3 from the mold W. The line 9 adjoins the resin outlet 3, and in the direction of flow of the two-component medium in the form of a resin/hardener mixture is provided first with a sensor 4 and then with a resin flow closing unit 5.

The required process data, for example the temperature to be generated in the mixing head, the conveyed volume of the motor-pump unit 117, 119 (see FIG. 1), the allowable pressure in the mold cavity F, etc. are input via the control system 11 of the injection unit 10, which is preferably coupled to an operating unit.

To produce a fiber composite component, the preform 6 is inserted into the opened mold W, and the mold halves 7, 8 thereof are closed. The resin-hardener mixture from the injection unit 10 is now supplied to the closed mold cavity F of the mold W via the injection unit 10. When the mold cavity F has been filled, the resin-hardener mixture rises upwardly through the ascending line and flows from the mold W, through the resin outlet 3, and into the transparent area 9.1 of the hose 9 adjoining the resin outlet. The sensor 4 situated at this area 9.1 detects the resin flow and emits a corresponding signal to the control unit 11, which in turn relays a signal to the resin flow closing unit 4 for closing the valve. During the injection process, the pressure in the mold cavity F is detected via the pressure sensor 2 and output to the control unit/control system 11. If the predefined allowable maximum pressure is exceeded, a signal for opening is relayed via the control system 11 to the resin flow closing unit 5, and/or the conveyed volume is reduced.

A collection container, not illustrated in FIG. 3, whose function has been described above is connected to the hose 9.

In addition to the above-mentioned exemplary embodiment, it is also possible to heat the media not in the mixing head 111, but, rather, in the media tanks 103/105 via an appropriate heating unit (not illustrated), and to only mix the media and hold them at a given temperature in the mixing head 111.

It is possible to use the control system 11 for data detection for quality assurance, in particular using a temperature and pressure sensor system. In particular, PC-regulated metering of the media is carried out by PC control via the speed control system of the motors on the metering pumps.

A high level of reproducibility of the products to be produced is ensured, and the mixing ratio and the injection speed may be set as desired. Flexible use of different resin systems requiring different mixing ratios is possible.

When pressure deviations occur outside the programmed specifications (limit value exceedance) in the cavity (mold cavity) of the mold, the conveyed volume is correspondingly adjusted, or the media are diverted into the recirculation system. In the event of malfunctions or mold exchange, a second line system (not illustrated) is provided which is controlled by pneumatic ball valves. Recirculation is thus possible; i.e., the media are conveyed back into their respective storage tanks even before the mixing operation.

Two (control) variants of the approach according to the invention are preferably implemented:

Variant 1—temporally detected and executed variant of the flushing operation:

In manual/automatic mode, the first closing of the pneumatic valves of the check valve unit (resin flow closing unit 5) is triggered by the "recognition" by the capacitive sensors of the resin-hardener mixture upon exit at the mold outlets. If the operator then starts the flushing operation in another injection process (opening and closing process of the pneumatic valves), the control system 11 writes and stores a chronological sequence of the state (0, 1) of all connected pneumatic valves until the end of the injection process. The operator needs the pressure displays in the partial areas of the mold for assistance in determining which pneumatic valve the operator opens or closes, and when. When both modes are executed, the control system 11 outputs auditory and visual warnings if the pressure parameters are above the predefined limit values. The user may take appropriate measures in response to these warnings.

Thus, in manual mode the opening/closing of the resin flow closing unit 5 takes place by temporally detecting and storing the operations carried out.

In a partially dynamic process, this written routine is a strictly temporally detected process of the opening and closing of the pneumatic valves of the check valve unit (resin flow closing unit 5). In automatic mode, the routine is then available to the user as a file, and is read by the software upon start-up of the automatic mode, and is started and executed at the appropriate time in the injection process.

When the injection process runs in automatic mode, the particular outputs at which the mixture first escapes and the first closing pulse is triggered are not crucial.

In automatic mode, the opening/closing takes place by temporally retrieving and executing the operations.

In the manual as well as the partially dynamic process, variant I covers most "changes" during the production of fiber composite components. Such small changes in the production process may influence the reproducibility of the components. A change is understood to mean, for example, the tolerances (component dimensions, material properties, position customizations, production staff) which occur from component to component.

However, to have an even more sensitive influence on the repeatability of the component production in the injection process, a second variant has been developed which is described below.

Variant 2 is based on the first variant with regard to the detection/storage of the "opening and closing" routine in manual mode.

In carrying out the flushing operation in automatic mode, variant 2 is expanded with regard to also taking into account the changing/increasing pressure in the cavity as the injection process proceeds over time.

This means that the control system independently influences the dynamic injection process, and compares the instantaneous internal pressure state to the predefined basic pressure parameters which are determined and stored in manual mode. The control system opens the valves (resin flow closing unit 5) at which exceedances of the pressure limit values occur, until the values drop below the limit values.

The injection process is extended by the slightly different routine of the individual valve in order to ensure that a sufficient quantity of the medium is also injected into the cavity. The process thus runs in a fully dynamic manner.

On the whole, the production of high-quality components requires that a component-specific "opening and closing" routine be carried out in the RTM process, which is possible due to the approach according to the invention.

Due to the different materials in an integral component and the associated possible changes in the production process from component to component, with the objective of a high level of repeatability and achieving optimal component quality, the "RTM robot" is configured to compensate for these changes. Such changes may have a significant influence on the component quality (surface finish, for example), strength (crosslinking of the materials), and post-treatment (any painting, for example) of the product.

Compensating for such process parts which are difficult or impossible to influence (for example, material density of a foam core, deviation in the reinforcement layers) results in the required homogeneity of the component, and opens the way for use in high-stress applications. The fiber and resin homogeneity of an integral component may be achieved only by a component-specific injection routine that is based on the reliable detection of the escape of resin from the mold cavity, optionally in conjunction with the pressures that occur in the mold cavity, via an appropriate control system.

Of course, it is also possible to completely or partially integrate into the mold the line section at which the sensor for detecting the resin flow is situated. However, the sensor is preferably situated outside the mold, directly downstream from the point of escape of resin from the mold.

LIST OF REFERENCE NUMERALS

2 Pressure sensor
3 Resin outlet
4 Sensor
5 Resin flow closing unit
6 Preform
7 Upper mold half
8 Lower mold half
9 Plastic hose
9.1 Transparent area
10 Injection unit
11 Control system
11.1 Screen
11.2 Desktop
12 Collection container
101 Container
103 Resin storage tank
105 Hardener storage tank
109 Cantilever arm
111 Mixing head
107 Hose assembly
113 Nozzle
115 Control cabinet
117/119 Motor-pump unit
B Rack shelf
E1 First level
E2 Second level
E3 Third level
F Mold cavity
P Profile rods
R Rollers
V Connecting profiles
W Mold

The invention claimed is:

1. Apparatus for carrying out a resin transfer molding process for producing an integral component, said apparatus comprising:
   a closable mold provided with a mold cavity and having at least one resin outlet connected to the mold cavity through which injection resin may escape after the mold has been filled;
   an injection unit coupled to the mold for introducing injection resin into the mold;
   a resin flow closing unit for closing said at least one resin outlet;
   a measuring unit situated at or downstream from the resin outlet for detecting a flow of escaping resin; and
   at least one pressure sensor for detecting a pressure which occurs in the mold cavity during the resin transfer molding process;
   wherein said measuring unit is coupled to the resin flow closing unit in such a way that the resin flow closing unit closes when an escaping resin flow is detected by the measuring unit; and
   wherein after the resin flow closing unit has been closed in response to a detection of escaping resin flow by the measuring unit, the resin flow closing unit is reopened if the pressure in the mold cavity exceeds a predefined pressure.

2. An apparatus as claimed in claim 1, wherein said at least one pressure sensor is situated in said mold cavity.

3. An apparatus as claimed in claim 1, wherein the mold has a plastic hose or a line which adjoins the resin outlet through which injection resin escaping from the mold flows, and the measuring unit detects the resin flow through the plastic hose or the line.

4. An apparatus as claimed in claim 3, wherein at least a portion of said plastic hose or said line is transparent, and the measuring unit is constructed in the form of an optical sensor or a capacitive sensor for resin flow detection and is situated at a transparent portion of said plastic hose or said line.

5. An apparatus as claimed in claim 1, wherein said resin flow closing unit is a pneumatically controlled check valve for interrupting the resin flow.

6. An apparatus as claimed in claim 1, wherein the mold has a plurality of resin outlets corresponding to the configuration of the integral component to be produced, and a measuring unit for detecting a flow of escaping resin is associated with at least one of said plurality of resin outlets.

7. An apparatus as claimed in claim 6, wherein a respective measuring unit for detecting a flow of escaping resin is associated with each of said plurality of resin outlets.

8. An apparatus as claimed in claim 1, wherein a plurality of pressure sensors are provided for detecting the pressure in the mold cavity.

9. An apparatus as claimed in claim 1, wherein the injection unit comprises a mixing head for mixing the injection resin and a hardener for the injection resin; said mixing head being supplied with the injection resin and the hardener from respective injection resin and hardener storage tanks each connected with the mixing head through a respective motor/pump assembly and a respective feed line; said mixing head further comprising a heating device for heating the injection resin and the hardener, and return lines parallel to the feed lines for returning unmixed injection resin and hardener to their respective storage tanks.

10. A resin transfer molding process for producing integral components using a closable mold provided with a mold cavity and having at least one resin outlet connected to the mold cavity through which a flow of injection resin may escape after the mold has been filled, and an injection unit which can be coupled to the mold for introducing an injection resin into the mold; said at least one resin outlet being closable by a resin flow closing unit;

wherein a measuring unit which detects the escaping flow of injection resin is situated at or downstream from the resin outlet and is coupled to the resin flow closing unit, and a signal for closing the resin flow closing unit is transmitted to the resin flow closing unit via a control system when an escaping resin flow is detected by the measuring unit, and the resin flow closing unit is closed and the resin flow escaping from the mold is interrupted, and wherein a pressure occurring in the mold cavity during the resin transfer molding process is detected by at least one pressure sensor, and after the resin flow closing unit has been closed in response to the signal from the measuring unit, the resin flow closing unit is reopened if a pressure exceeding a predefined pressure is detected in the mold cavity.

11. A process as claimed in claim 10, wherein when a pressure exceeding a predefined pressure is detected in the mold cavity and the resin flow closing unit is reopened, the measuring unit for detecting the resin flow is deactivated, and after the pressure drops below said predefined pressure, the resin flow closing unit once again closes.

12. A process as claimed in claim 10, wherein:

the injection unit comprises a mixing head for mixing conveyed volumes of the injection resin and of a hardener for the injection resin; and the conveyed volume of the injection resin and of the hardener is reduced when the predefined pressure in the mold cavity is exceeded.

13. A process as claimed in claim 11, wherein in a manual/automatic mode, the first closing of the resin flow closing unit is triggered as a result of a sensor of the measuring unit detecting injection resin escaping through the at least one resin outlet; and at the start of a flushing operation in the further injection process, the opening and closing process of the resin flow closing unit is detected and stored by the control system as a chronological sequence of the on/off state of all connected resin flow closing units until the end of the injection process, and the control system emits auditory and/or visual warnings if pressure parameters above the predefined pressure are detected; or in a partially dynamic process, the routine which is detected and recorded in a manual process is carried out as a temporally detected process of the opening and closing of the pneumatically controlled check valves in the form of the resin flow closing unit; or in an automatic mode the routine of the partially dynamic process is available as a file, and is read by software upon start-up of the automatic mode, and is started and executed at an appropriate time in the injection process.

14. A process as claimed in claim 13, wherein said process is carried out in the automatic mode while also taking into account the detected pressure in the mold cavity as introduction of injection resin into the mold cavity proceeds over time, and the control system opens the resin flow closing unit when the detected pressure exceeds the predetermined pressure until the detected pressure drops below said predetermined pressure.

* * * * *